Nov. 15, 1955  N. P. DARASH  2,723,686
SAFETY CONVEYOR DRIVE
Filed Jan. 16, 1952  4 Sheets-Sheet 1

INVENTOR.
NICHOLAS P. DARASH
BY
RICHEY, WATTS, EDGERTON & McNENNY
Frederic B. Schramm
ATTORNEYS

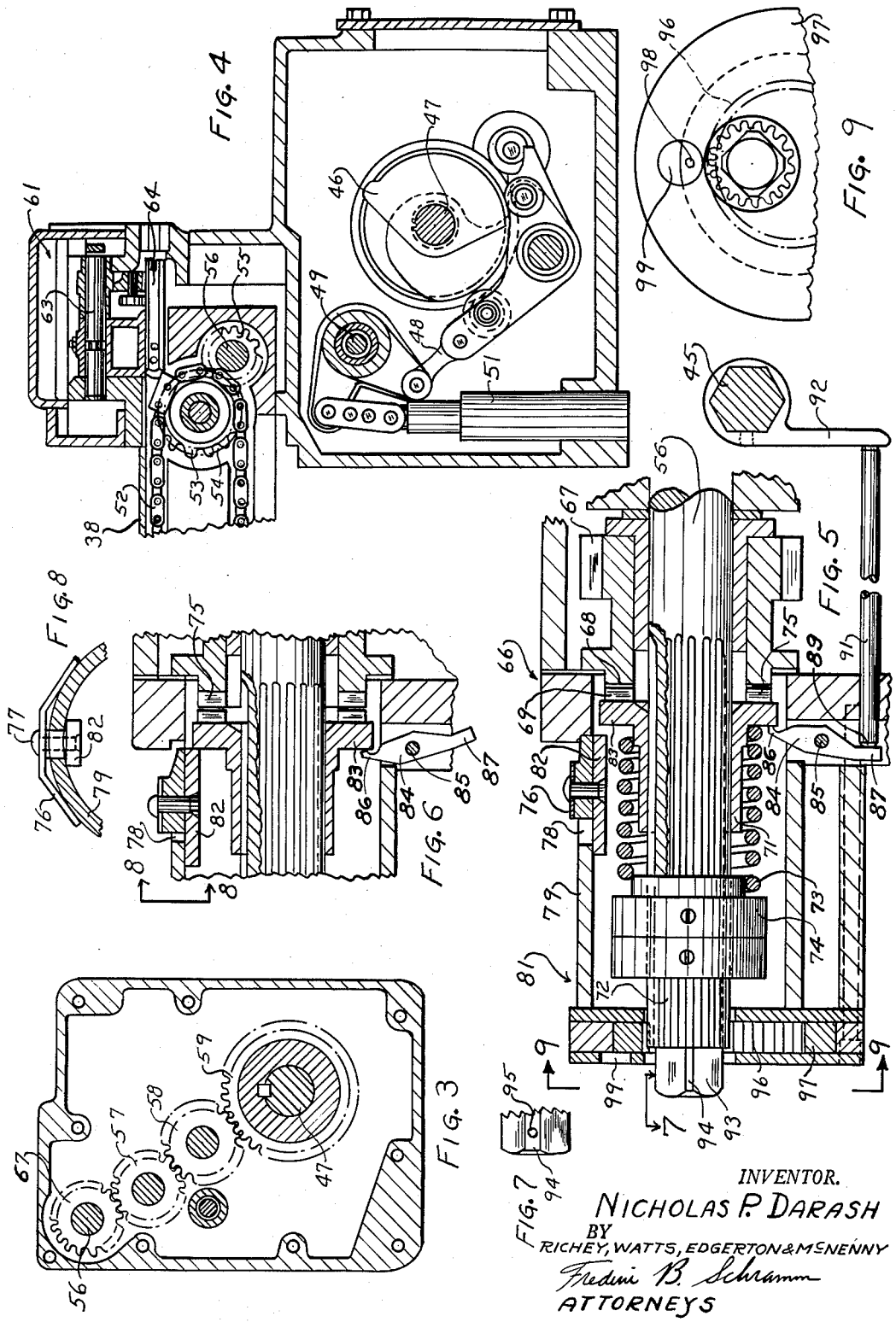

Nov. 15, 1955
N. P. DARASH
2,723,686
SAFETY CONVEYOR DRIVE
Filed Jan. 16, 1952
4 Sheets-Sheet 4
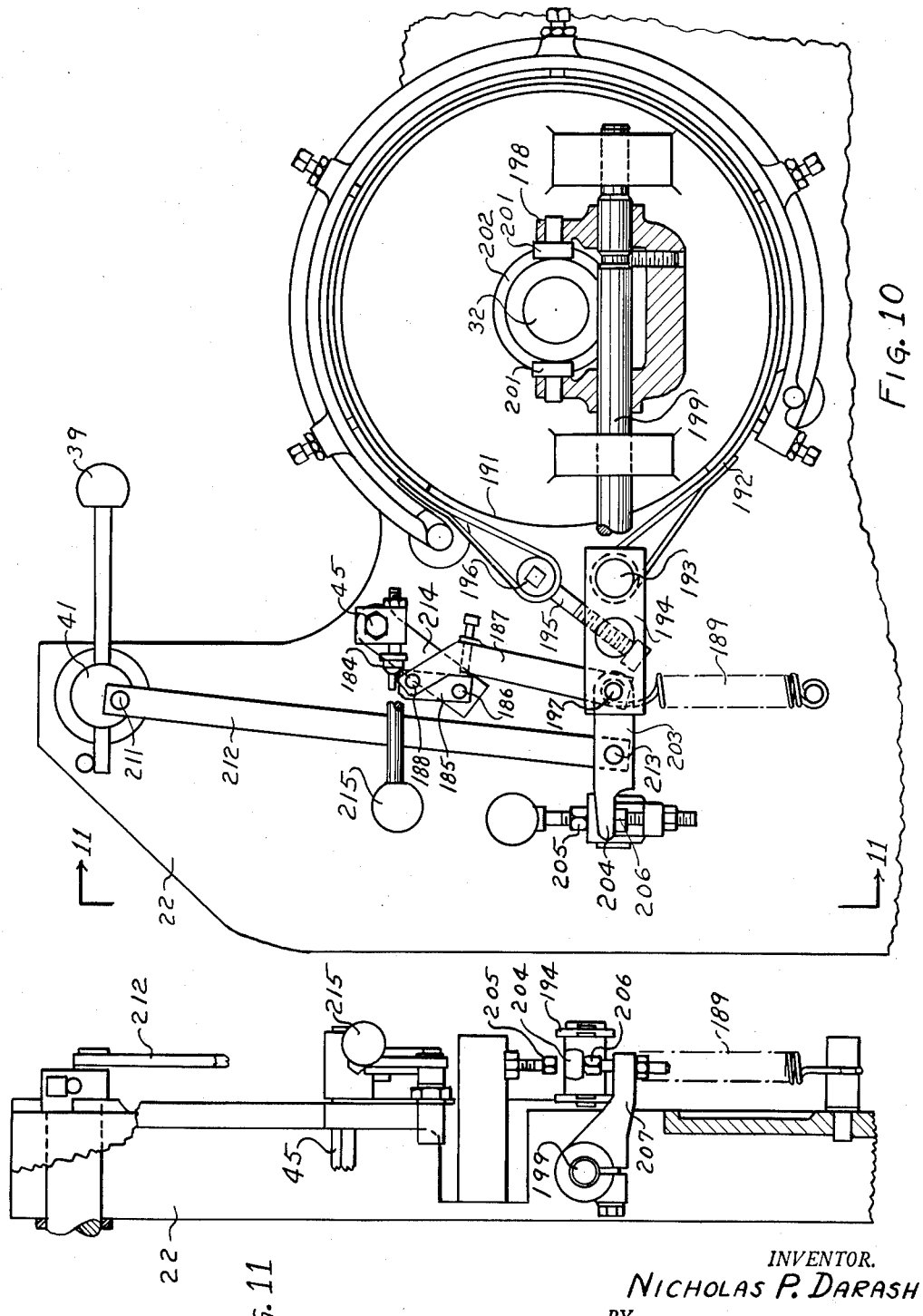
INVENTOR.
NICHOLAS P. DARASH
BY
RICHEY, WATTS, EDGERTON & McNENNY
Fredric B. Schramm
ATTORNEYS United States Patent Office 2,723,686
Patented Nov. 15, 1955

2,723,686

SAFETY CONVEYOR DRIVE

Nicholas P. Darash, Cleveland, Ohio, assignor to The Warner & Swasey Co., Cleveland, Ohio, a corporation of Ohio Application January 16, 1952, Serial No. 266,703

2 Claims. (Cl. 139—336)

The invention relates to high speed weaving and concerns particularly the assurance of safe operation of the shuttle conveyor drives in weaving machines of the gripper shuttle type, synchronously with the remainder of the mechanism.

In gripper shuttle weaving machines a new attachment of the weft thread is made to the shuttle each time before a shuttle is shot through the shed from the picking box to the receiving box. A plurality of shuttles is provided. Each shuttle in turn is dropped from the receiving box upon a conveyor, similar to an endless belt or chain, which runs under the shed and returns the shuttles from the receiving side of the loom to the picking side. At the picking side there is an elevator which at the proper instant removes each shuttle from the conveyor and delivers it to the picking box in order that it may receive an end of weft thread and be picked or projected through the shed. Manifestly, the various motions must be synchronized or take place in properly timed sequence.

An object also of the invention is accordingly to maintain the proper relationship between the shuttle lifting operation and the position of the shuttle on the shuttle conveyor in gripper shuttle type weaving machinery, while guarding against jamming or breakdown of the machinery by reason of faulty movement of a shuttle or some portion of the conveyor.

Still another object of the invention is to provide effective means for suspending the movement of the shuttle conveyor drive and relieving force thereon in the event of jamming of the drive or the shuttle.

Another object of the invention is to cause a high speed weaving machine of the gripper shuttle type to be shut down in the event of any jamming of the shuttle or the shuttle conveyor drive.

A further object of the invention is to provide the machine operator with an indication that the shuttle conveyor has been disturbed in its relationship to the remainder of the loom mechanism in the event of a shut down resulting from jamming of the conveyor drive.

A further object of the invention is to provide for indexing the relationship between the shuttle conveyor drive and the remainder of the apparatus in the event of disturbance of the relationship, resulting from jamming of the conveyor drive.

Other and further advantages, features and objects of the invention will become apparent as the description proceeds.

In carrying out the invention in a preferred form thereof a claw clutch of the type that disengages upon overload is interposed in the connection between the main drive shaft of the loom and the drive for the conveyor which carries the shuttles back from the position below the receiving box to a position below the packing box and into appropriate relationship to the shuttle lifting mechanism. The lifting mechanism or elevator may be of the type shown in the pending application of Robert Whewell, Serial No. 112,233 filed August 25, 1949, now Patent No. 2,599,731 or in the Patent 2,420,380 to Moessinger. The invention may be carried out in high speed weaving machinery of the gripper shuttle type generally similar to the disclosures in such patents as 2,099,627 to Rossmann, 2,538,798 to Pfarrwaller, and my copending applications Serial No. 111,416 filed August 20, 1949, now Patent No. 2,654,397, Serial No. 204,867 filed June 8, 1951, now Patent No. 2,660,201, and Serial No. 228,858 filed May 29, 1951, now Patent No. 2,693,830.

To form the yieldable clutch the shaft driving the shuttle conveyor carries loosely thereon a gear which meshes with suitable gear drive from the main drive shaft of the weaving machine. One part of the conveyor drive clutch is connected with or integral with the said gear and a second clutch part is provided which may move axially upon the shuttle conveyor drive shaft but is constrained to rotate therewith by suitable means such as splines or the like. The clutch parts have mating teeth which are slant sided like saw teeth and relatively shallow so that in the event of jamming of the conveyor drive the two clutch parts may be forced against the pressure of a suitable restraining spring, so as to disconnect the conveyor drive from the main drive shaft. An indicator is provided which is responsive to the axial movement of the clutch part which has been forced away from the other. A stop mechanism is provided which is also responsive to such axial movement of such clutch part in order to cause the entire machine to be shut down upon disengagement of the conveyor drive safety clutch.

To assist the operator in resetting the drive shaft in its proper angular relation to the main drive of the machine after the apparatus has been shut down an indexing plate is provided which rotates with the conveyor drive shaft.

A better understanding of the invention will be afforded by the following detailed description considered in conjunction with the accompanying drawings in which Fig. 1 is a front view of the weaving machine, that is a view as seen from the operator's side, with the center broken away to save space.

Fig. 3 is view of a cross-section cut by a plane 3—3 indicated in Fig. 2.

Fig. 4 is fragmentary view of a cross-section cut by a plane 4—4 indicated in Fig. 2.

Fig. 5 is an enlargement of the portion of Fig. 2 showing the safety clutch in which the clutch is shown in normal, conveyor-driving position.

Fig. 6 is fragmentary sectional view of the clutch drawn to the same scale as Fig. 5, but showing the clutch in disengaged position.

Fig. 7 is top view of the end of the conveyor drive shaft shown in Fig. 5.

Fig. 8 is a fragmentary view of a cross-section of the apparatus of Figs. 5 and 6, showing the clutch-disengagement indicator, as seen from the end of the conveyor shaft.

Fig. 9 is a fragmentary end view of the apparatus of Fig. 5 taken on line 9—9.

Fig. 10 is a fragmentary view of the apparatus of Fig. 1, partially in cross-section as seen from the right, showing a portion of the master stop motion, including particularly the details of the brake and clutch mechanism for the main drive shaft.

Fig. 11 is a view of the apparatus of Fig. 10 partially in cross-section represented as cut by a plane 11—11 indicated in Fig. 10.

Like reference characters are utilized throughout the drawings to designate like parts.

Figure 1:
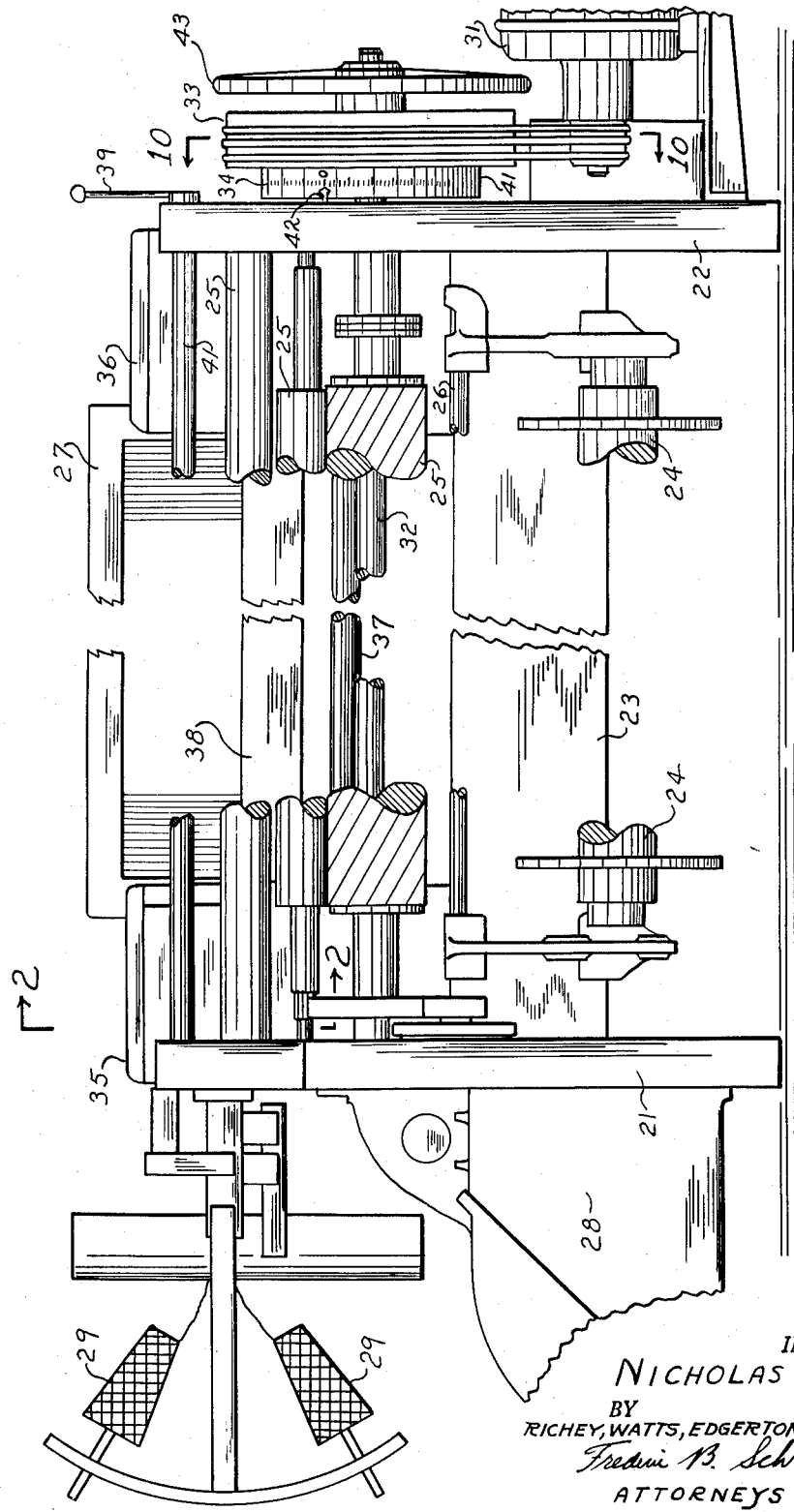

Referring to the drawings, in the form of apparatus shown by way of illustration, the weaving machine comprises a supporting frame including a pair of side plates 21 and 22 (represented in Fig. 1) secured to a main plate member 23. There is a cloth beam 24 with take-up mechanism including rolls 25 and a rod 26. Heddle frames 27 are visible at the top of the machine in Fig. 1. Shedding mechanism is enclosed within a housing 28, shown at the left in Fig. 1, and one or more stationary spools or packages 29 are provided for the weft yarns. The machine may be provided with shuttle picking, guiding and conveying mechanism of the general type illustrated in Patents Nos. 2,160,338, 2,160,339, 2,316,703, 2,420,380 to Moessinger and Patent No. 2,099,627 to Rossmann.

In the apparatus represented in Fig. 1 there is an electric motor 31, which drives the main shaft 32 through a suitable connection such as a belt or chain drive 33. In order to facilitate rapid stoppage of operating parts of the weaving machine in case of yarn failure or failure of some operative part of the weaving machine, an automatically operating clutch and brake mechanism is also provided which is concealed within the drum 34 represented in Fig. 1.

Picking and receiving boxes 35 and 36 respectively are secured to the bed 23. Extending therebetween are a lay-bar shaft 37 and a shuttle conveyor 38. A manual control handle 39 on a shaft 41 is provided together with numerous stop motions. The stop motions are all so arranged as to disengage the main shaft clutch and apply the main shaft brake mechanism within the drum 34 by acting upon a common master stop shaft 45 (Figs. 5, 10 and 11). One of these stop motions will be described more in detail in connection with the safety conveyor drive. The others, not constituting a part of the present invention are not described herein, but include such devices as weft and warp yarn failure detectors, receiving box shuttle feelers and the like.

As shown in Fig. 4 the picking box or auxiliary device 35 contains picking mechanism including cams 46 carried by a picker shaft 47 cooperating with suitable cam follower and linkage mechanism 48 for cocking a torsion rod 49. Damping mechanism 51 is also visible in Fig. 4. The picker shaft 47 is arranged to be driven by the main drive shaft 32 through bevel gearing 39. It will be understood, that in shuttle weaving machines of the type in question the torsion rod 49 is twisted once for each revolution of the main drive shaft 32 so that it may be released at the appropriate time in relation to the action of the other mechanism to apply a propelling force to the shuttle which is to be shot through the shed. The conveyor mechanism for supplying the shuttles to the receiving box is accordingly to be driven in synchronism with the picker shaft 47.

The housing for the picker end of the conveyor and also the shuttle lifter are secured to or integral with the picking box 35. As shown in Fig. 4 the conveyor 38 includes a conveyor chain 52 carried at the picker end by a sprocket 53 and driven thereby. The sprocket 53 is secured to a gear 54 meshing a pinion 55 secured to an auxiliary shaft 56 serving as the conveyor drive shaft. As shown in Fig. 3 gears 57 and 58 are interposed between a gear 67 loosely mounted on the conveyor drive shaft 56 and a gear 59 keyed to the picker shaft 47. There is a shuttle lifter 61, such as described in greater detail in the said application Serial No. 112,233, now Patent No. 2,599,731, of Robert Whewell, Jr., including a shuttle holder 62 adapted to be pivoted through approximately one fourth of a revolution around a shaft 63 for lifting the shuttle 64 from the position shown in Fig. 4 to which it has been delivered by the conveyor chain 52 to a picking position at 65 indicated in Fig. 2.

Figure 2:
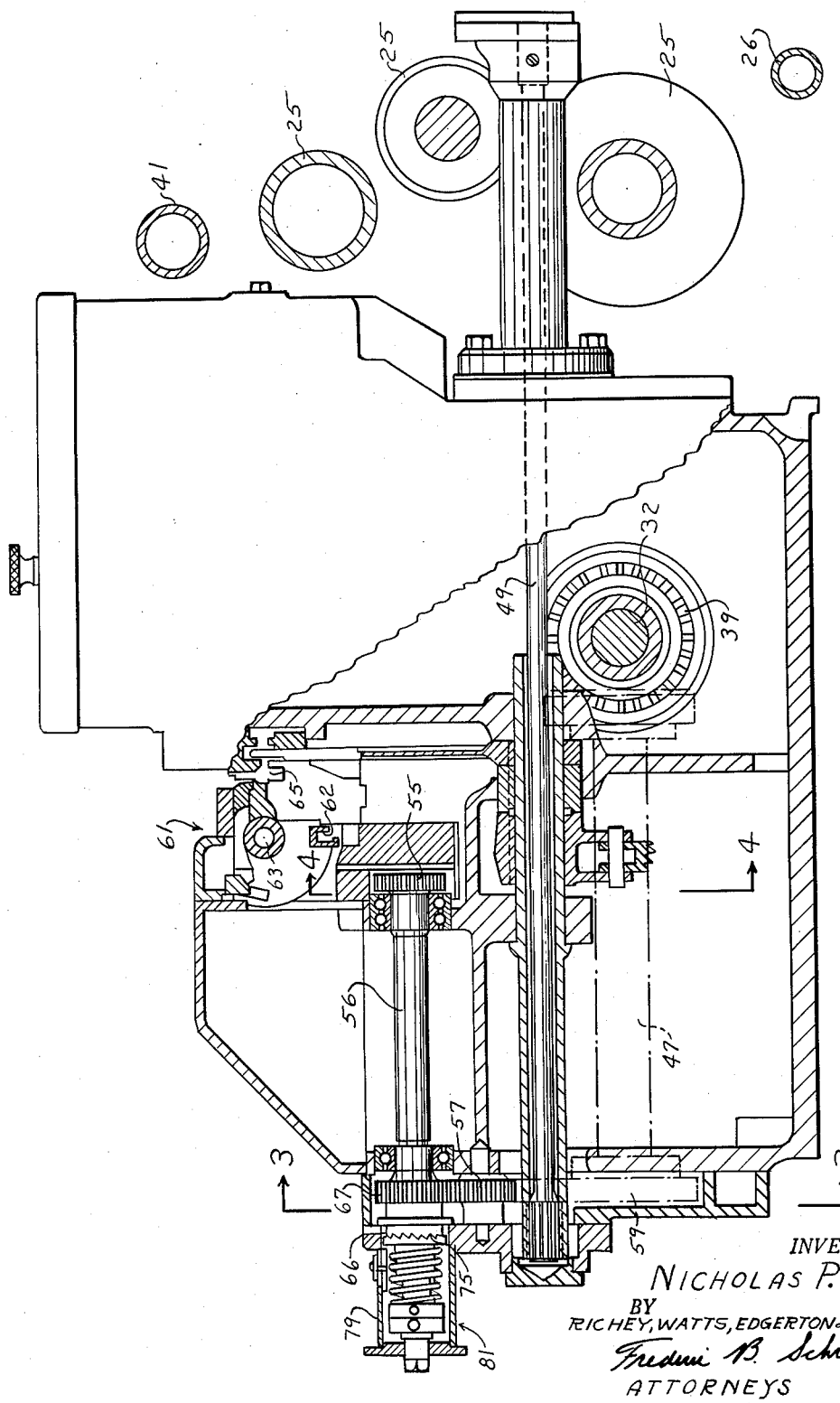
Fig. 2 is a fragmentary left-hand end view of the machine represented as having the picker box broken away to expose a partial section cut by a plane 2—2, indicated in Fig. 1, through the picker box, main drive shaft, conveyor drive, shuttle lifter and safety clutch.

For relieving the force on the conveyor in the event that one of the shuttles 64 should become jammed or some other difficulties should arise with the conveyor chain 52, an overload clutch 66 is interposed in the connection between the conveyor drive shaft 56 and the gear 67 through which the conveyor drive shaft is driven from the picker shaft 47. The gear 67 is arranged to run freely on the conveyor drive shaft 56 as shown in Fig. 5 and is not keyed thereto. The clutch 66 includes a claw portion 68 integral with the gear 67 and a second claw portion 69 integral with a sleeve 71 keyed or splined to the conveyor drive shaft 56 as represented by splines 72. A spring 73 is provided acting between a collar 74 secured to the shaft 56 and the axially movable clutch member 71 for keeping the clutch parts in engagement. The clutch parts 68 and 69 have relatively shallow engaging teeth 75 as shown in Fig. 2 in order to enable the clutch parts to be forced apart or separated in the event that the conveyor drive jams.

In order to provide the operator with an indication that there has been a change in the timed relation between the conveyor shaft 56 and the main drive shaft 32 due to the separation and disengagement of the clutch parts, a visible indicator is provided which may take the form of a strip spring 76 secured to a rivet or a suitable fastener 77 extending through a longitudinal slot 78 in the upper wall 79 of the clutch casing 81 and secured at the lower end to a slide 82 adapted to be engaged by a flange 83 on the driven clutch part 69 in case of longitudinal movement thereof for pushing the indicator 76 to the left from the normal position as seen in Fig. 5 to the position shown in Fig. 6.

Moreover, in order to avoid any damage to the other parts of weaving machinery a linkage is provided for operating a stop shaft 45 in the event that the clutch part 69 is forced to the left. This may take the form of a lever 84 pivotally supported at the center by a pin 85, and having a nose 86 adapted to be engaged by the flange 83 of the clutch part 69 and having a lower end 87 pressing against the left end 89 of a stop rod 91, bearing against an arm 92 on the stop motion shaft 45. The arrangement is such that motion of the flange 83 to the left rotates the lever 84 counter-clockwise and presses the rod 91 to the right, producing counter-clockwise motion of the stop shaft 45, which as will be explained more in detail hereinafter, causes the apparatus to be shut down.

As shown in Figs. 5, 7 and 9 the end 93 of the shaft 56 is cut square with the edges 94 beveled off. An index marker 95 is provided as shown in Fig. 7 on one of the beveled edges 94. The splines 72 on the shaft 56 are continued up to the squared end 93 so as to serve as external gear teeth of a pinion, and an internally toothed gear 96 is provided which is adapted to mesh with the teeth at the end position of the shaft 56 adjacent to the squared end 93. A circular casing 97 is provided at the end of the clutch housing 81 for retaining the internally toothed ring gear 96 while permitting it to rotate freely. The outer face of the ring gear 96 is also provided with an index mark 98 and a window 99 is provided in the casing 97 to permit the index 98 to be visible when the gear 96 is in the angular position with the part carrying part index 98 uppermost.

The ratio between the number of splines, teeth or serrations 72 on the conveyor drive shaft 56 and the number of teeth in the internal-tooth ring gear 96 is made equal to the ratio between the number of gear teeth on the gear 67 and the number of teeth on the gear 59 carried by the shaft 47, multiplied by the speed ratio between the shaft 47 and the main drive shaft 32. The main drive shaft 32 is provided with a dial plate graduated in degrees or the like, or with graduations 41 on the drum 34 cooperating with an index 42 secured to the side plate 22 to show the rotation thereof from a zero point at which all loom parts are in a predetermined position. When the apparatus is originally assembled the gears are secured on the shafts with the links on the conveyor chain 52 in the proper angular relationship to the remainder of the apparatus when the main shaft 32 is in its zero position and the index marks 95 and 98 are radially aligned.

When the apparatus is originally assembled with the clutch parts 68 and 69 engaged and with the shaft 56 and the gear 67 in the proper timed relationship to the other parts of the weaving machine the internally toothed ring gear 96 is so positioned in relation to the shaft 56 that the index marks 95 and 98 will be visible together, that is with the index 95 visible at the top of the squared shaft end 93 and the index 98 visible in the window 99. As long as the shaft 56 and the pinion 67 retain the same angular relationship so that all parts are properly synchronized, the index marks will continue to register as described. However, if there should be a jamming of the shuttle conveyor causing the clutch parts 68 and 69 to become disengaged, the angular relationship between the driving gear 67 and the conveyor drive shaft 56 will change, resulting in change in the angular relationship between the index marks 95 and 98. The mark 98 will then not be visible in the window 99 when the shaft 56 is in the position with the mark 95 on top.

After a shutdown of the weaving machine due to jamming of the shuttle conveyor the operator has been advised of the disengagement of the clutch parts 68 and 69 and the disturbance of the timed relationship between the conveyor shaft 56 and the main drive shaft 32 by the displacement of the indicator 76. Consequently, before restarting the machine which has been shut down automatically by the action of the stop shaft 45, the operator applies a manual turning device or crank to the squared end 93 of the shaft 56 in order to turn it manually. In order to bring about the proper angular relationship between the shaft 56 and the gear 67 which is in non-slipping relationship to the other parts of the apparatus, the operator brings the main drive shaft to its zero position using the handwheel 43, if necessary, and turns the shaft 56 until the index 98 is again visible in the window 99 when the shaft 56 is in the position with the index 95 up. The operator then restores the index 76 to the normal position and the apparatus may be restarted by the manual starting handle 39.

The clutch and brake mechanism within the housing 34 of Fig. 1 and the mechnism for operating them in response to rotation of the master stop shaft 45 are shown in Figs. 10 and 11. As illustrated therein, the stop shaft 45 carries an abutment pin 184 normally locking in place a brake linkage comprising a link 185 having a pivot 186 and a lever 187 pivotally secured to the link 185 by a pin 188. For urging the lower end of the lever 187 downward there is a tension spring 189. The main brake for the main drive shaft 32 comprises a brake drum 191, with which cooperates a brake band 192 secured at one end to a fixed pin 193. Pivotally mounted upon the fixed pin 193 there is a lever 194 carrying an adjustable link 195 to which is secured the opposite end 196 of the brake band 192. The lever 194 is pivotally secured at the left-hand end by a pin 197 to the lower end of the brake linkage lever 187.

The clutch within the housing 34 for the main drive shaft 32 comprises a yoke 198 carried by a rotatable, clutch-engaging and disengaging shaft 199 and carrying shoes 201 adapted to cooperate with an annular groove 202 of a conventional axially movable friction clutch mounted on the main drive shaft 32.

For rotating the clutch-disengaging shaft 199 in response to rotation of the master stop shaft 45 to engage the clutch, a link 203 is provided which is pivoted at the right-hand end to the pin 197 in the end of the lever 194 and has a nose 204 at the left-hand end (referring to Fig. 10) adapted to ride between two abutments 205 and 206. The abutment 205 is fixed to the frame of the weaving machine and the abutment 206 is adjustably secured to the end of a crank 207 fixed upon the clutch disengagement shaft 199. A spring, not shown, is provided for turning the shaft 199 counterclockwise (as seen in Fig. 11) to the disengaging position when not held by the nose 204.

For manual operation of the brake band 192 and the clutch yoke 198, the manual start-stop lever 39 is mounted to be rotatable about control shaft 41 and has a link 212 connected to the lever 39 by a pin 211 slightly off the pivot center of the lever 39 and connected at the lower end by a pivot pin 213 to the lever 203. A lever 214 is fixed to the master stop shaft 45 carrying the pivot pin 186 for the link 185. The shaft 45 also carries a handle 215.

The handle 39 is in the running position.

When the stop shaft 45 is rotated in a clockwise direction, the abutment pin 184 also rocks and lever 185 slips off the abutment pin 184 and is pulled downward by spring 189, the lever 194 is pivoted around pin 193 and sets the brake. The downward movement of lever 187 pivots the link 203 around the pin 213 and nose 204 of link 203 goes up against abutment 205 releasing crank 207 and rotating shaft 199 to release the main drive shaft clutch.

The handle 215 is fixed to the stop shaft 45. Its movement upward manually will break the lock between the abutment pin 184 and the lever 185 and produce the action above described if it is desired to stop the apparatus manually.

The handle 39 is used to start the machine. Lifting the handle 39 lifts the lever 212 and since nose 204 of the link 203 is against abutment 205, it acts as a pivot point and the link 203 is restored to the position shown in Fig. 11, resetting the locking action between lever 185 and abutment pin 184.

The handle 39 can be used to release the clutch whenever the stop shaft 45 has not been rotated. Lifting handle 39 will lift lever 212 causing link 203 to pivot about pin 197 and lift the nose 204 of the link 203 away from abutment 206 up against abutment 205 taking the pressure off of crank 207 and thus releasing the clutch. In this operation the brake is not operated since lever 194 has not been moved from the position shown in Fig. 10.

The operation of the apparatus in the form illustrated is as follows:

In order to re-start the apparatus after it has been shut down, the stop motion handle 215 and the start-stop handle 39 are brought to the position shown in Fig. 10. With the main clutch and main brake in the positions indicated by Figs. 10 and 11, the apparatus is in running condition. The motor 31 is rotating, driving the main shaft 32, which rotates whenever the control handles are in the position shown in Fig. 10. The picker shaft 47, being geared to the main drive shaft 32, is rotating whenever the main shaft 32 is rotating. It is to be understood that the picker mechanism and various other auxiliary devices not shown, such as the tucking mechanism and the cutting-off mechanism of a gripper shuttle type weaving machine are also driven by the picker shaft 47.

In case the shuttle conveyor 38 should jam, the clutch parts 68 and 69 would be parted, turning the lever 84 counterclockwise and moving the rod 91 to the right, so as to produce rotation of the stop shaft 45, thereby bringing the main shaft 32 to a stop and shutting down all the mechanism driven by the main shaft 32. The manner in which the rotation of the stop shaft 45 functions to release the main clutch and apply the main brake is illustrated in Figs. 10 and 11. As seen from the side of the apparatus as illustrated in Fig. 5, the stop shaft 45 is rotated counterclockwise, but as seen from the side illustrated in Fig. 10, the shaft is rotated in the clockwise direction by the operations previously explained. Referring to Fig. 10 when the shaft 45 rotates in the clockwise direction, the abutment pin 184 rises, releasing the link 185. The rotation of the lever 214 carried by the stop shaft 45 also carries the pivot 186 for the link 185 slightly to the left whereby the spring 189 is permitted to draw the link 187 down with great rapidity, thereby rotating the brake-operating arm 194 counterclockwise around its stationary pivot 193. This tightens the brake band 192 around the drum 191 and brings the main shaft 32 to an immediate stop, the clutch having been simultaneously disengaged. Since the picker shaft 47 is geared to the main drive shaft 32, it also comes to a stop.

The means whereby the disengagement of the main clutch 202 took place is illustrated in Fig. 10. The downward motion of the pin 197 at the upper end of the spring 189 when the linkage 186, 187 is released causes the link 203 to rotate clockwise around the pivot pin 213 which is stationary for the moment, causing the nose 204 to rise and allow the lever 207 and the clutch control shaft 199 to rotate counterclockwise as seen in Fig. 10 under the force of a spring, not shown, to disengage the clutch.

After the apparatus has been shut down as a result of the operation of the stop shaft 45 in response to conveyor jamming as described, or some other failure acting upon the stop shaft 45 (not herein described, as it does not constitute a part of the present invention), or after the apparatus has been shut down manually, it is re-started by the operation of the stop-start lever 39. The handle 39 is first raised. This releases the brake band 192 by stretching the spring 189 and lifting the pins 213 and 197. Since the nose 204 strikes against the upper fixed abutment 205 shown in Fig. 10, the lifting action of the pin 213 also forces the pin 197 upward. (When the apparatus was shut down, the counterclockwise rotation of the shaft 45 had raised the handle 215. This handle falls by reason of its weight to the normal running position illustrated in Fig. 10 thereby cocking the linkage 186, 187 and locking the link 185 under the abutment pin 184.) The start-stop handle 39 is thereupon returned to the downward position, the pin 197 is now a fixed pivot and the link 203 is caused to pivot around it. Consequently, this brings about downward motion of the pin 213. As the handle 39 is restored to the downward position, as illustrated, it causes the nose 204 to move downward, bearing downward against the abutment 206 secured to the clutch operating lever 207, rotating the clutch shaft 199 clockwise as illustrated in Fig. 10 and reengaging the clutch. The apparatus is now in normal running condition.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention which is defined in the appended claims.

What is claimed is:

1. Safety mechanism comprising in combination with a drive shaft adapted to be driven by a source of power, an auxiliary device in such apparatus having a shaft driving it, a gear running loosely on the auxiliary device shaft, gearing interconnecting said gear with said drive shaft, an overload clutch comprising a pair of clutch parts, one secured to said free running gear and the other secured to the auxiliary shaft, with elements movable from the other clutch part for disengagement and resilient means for normally urging the clutch parts together, there being a zero mark carried by the drive shaft and an index upon an auxiliary device shaft, the latter shaft having spline teeth near the end thereof, and an internally toothed ring spline adapted to mesh said latter gear teeth, said ring gear having a face and an index being formed on said ring face which is normally in radial alignment with the index upon the shaft when the auxiliary device shaft occupies a predetermined angular relationship, whereby after disengagement of the clutch parts the elements connected to the two clutch parts may be restored to a predetermined angular relationship by observation of the index marks.

2. In a loom, a safety mechanism comprising in combination with a main drive shaft adapted to be driven by a source of power, an auxiliary device for a shuttle conveyor for said loom having a driving shaft, a gear mounted for rotation on the auxiliary device shaft, gearing interconnecting said gear with said main drive shaft, an overload clutch comprising a pair of clutch parts, one part secured to said gear and the other secured to the auxiliary shaft, with elements movable from the other clutch part for disengagement and resilient means for normally urging the clutch parts together, there being a zero mark carried by the drive shaft and an index upon the auxiliary device shaft, an index gear adapted to be driven by said auxiliary shaft, said index gear having a face and an index thereon which is maintained in fixed angular relationship with the index upon said auxiliary shaft, said index on said index gear normally in phase with said zero mark on said main drive shaft, whereby after overload disengagement of the clutch parts, the driving shaft of the auxiliary device may be manually rotated to bring said indices in radial alignment position, and the clutch parts restored to engagement with the index on the index gear in phase with said zero mark on the main drive shaft.

References Cited in the file of this patent

UNITED STATES PATENTS

| 1,812,480 | Haywood | June 30, 1931 |
| 1,932,362 | Halvorsen | Oct. 24, 1933 |
| 1,938,720 | Preble | Dec. 12, 1933 |
| 2,055,228 | Brouwer | Sept. 22, 1936 |
| 2,099,627 | Rossmann | Nov. 16, 1937 |
| 2,205,370 | Brice | June 18, 1940 |
| 2,538,798 | Pfarrwaller | Jan. 23, 1951 |
| 2,639,732 | Moessinger | May 26, 1953 |

FOREIGN PATENTS

| 254,212 | Switzerland | Dec. 16, 1948 |